US010324308B2

(12) United States Patent
Isaka (10) Patent No.: US 10,324,308 B2
(45) Date of Patent: Jun. 18, 2019

(54) IMAGE STABILIZATION APPARATUS, LENS APPARATUS HAVING IMAGE STABILIZATION APPARATUS, AND IMAGE PICKUP APPARATUS HAVING IMAGE STABILIZATION APPARATUS (71) Applicant: CANON KABUSHIKI KAISHA, Tokyo (JP)

(72) Inventor: Mitsuhiro Isaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 15/466,997

(22) Filed: Mar. 23, 2017

(65) Prior Publication Data
US 2017/0285364 A1 Oct. 5, 2017

(30) Foreign Application Priority Data
Mar. 31, 2016 (JP) .................................. 2016-070760

(51) Int. Cl.
G02B 27/64 (2006.01)
G03B 17/12 (2006.01)
H04N 5/232 (2006.01)

(52) U.S. Cl.
CPC ............ G02B 27/646 (2013.01); G03B 17/12 (2013.01); H04N 5/23287 (2013.01); G03B 2205/0015 (2013.01)

(58) Field of Classification Search
None
See application file for complete search history.

(56) References Cited

U.S. PATENT DOCUMENTS

| 5,059,791 | A | * | 10/1991 | Ishizuka | .................. | G01D 5/38 250/231.17 |
| 5,063,291 | A | * | 11/1991 | Buehring | ........... | G01D 5/24404 250/231.16 |
| 6,635,863 | B1 | * | 10/2003 | Nihommori | ....... | G01D 5/34715 250/231.13 |
| 2010/0097498 | A1 | * | 4/2010 | Zaifrani | ................. | G02B 7/102 348/240.99 |
| 2016/0299350 | A1 | * | 10/2016 | Hu | ........................... | G02B 7/10 |
| 2017/0285364 | A1 | * | 10/2017 | Isaka | ................... | G02B 27/646 |

FOREIGN PATENT DOCUMENTS

| JP | 2002268107 A | 9/2002 |
| JP | 2012130231 A | 7/2012 |

* cited by examiner

Primary Examiner — William B Perkey
(74) Attorney, Agent, or Firm — Rossi, Kimms & McDowell LLP (57) ABSTRACT An image stabilization apparatus for a lens apparatus that moves an image stabilizing lens perpendicularly to optical axis includes a fixed barrel, a lens moving frame holding the image stabilizing lens and movable relative to the fixed barrel perpendicularly to the optical axis, an actuator that drives the lens moving frame relative to the fixed barrel, and the encoders used to determine the position of the lens moving frame relative to the fixed barrel. Each encoder includes a scale fixed to either the lens moving frame or the fixed barrel and a detector fixed to the other, the scale is arranged so that its grating is arranged in a radial direction about the optical axis so that the encoder has sensitivity to radial displacement of the lens moving frame about the optical axis which is higher than sensitivity to rotational displacement of the lens moving frame about the optical axis.

7 Claims, 12 Drawing Sheets

IMAGE STABILIZATION APPARATUS, LENS APPARATUS HAVING IMAGE STABILIZATION APPARATUS, AND IMAGE PICKUP APPARATUS HAVING IMAGE STABILIZATION APPARATUS

BACKGROUND OF THE INVENTION

Field of the Invention

The present invention relates to an image stabilization apparatus having an actuator and more particularly to the arrangement of position detectors of an image stabilization apparatus.

Description of the Related Art

In a camera module including a lens system and an image pickup element provided in a camera used to capture images, it is known to reduce the effect of hand vibrations occurring during image shooting by driving a lens(es) in directions perpendicular to the optical axis of the lens system. In optical systems having such a vibration reduction function, it is necessary to drive a lens(es) in directions perpendicular to the optical axis at high speed with high accuracy. To this end, various image stabilization apparatuses using actuators such as voice coil motors have been developed. Recently, image stabilization apparatuses using an ultrasonic motor that works utilizing vibration of a vibrator such as a piezoelectric element to improve accuracy in image stabilization have been developed. Such apparatuses use two or more ultrasonic motors to provide a two-dimensional driving device enabling a moving element to move in two dimensional directions by combined driving or the ultrasonic motors, to constitute an image stabilization apparatus. The design of one of such image stabilization apparatuses will be described in the following.

Japanese Patent Application Laid-Open No. 2012-130231 discloses a design of an image stabilization apparatus having four ultrasonic motors and three detectors.

In the image stabilization apparatus disclosed in Japanese Patent Application Laid-Open No. 2012-130231, a lens moving frame is supported mechanically and has play. In cases where the lens moving frame is displaced from a desired position due to play, a position control works to return the lens moving frame to the desired position. In the case where scales are arranged in such a way that the scale pitch direction of them is oriented perpendicular to the radial direction from the optical axis of the lens, as is the case in the apparatus disclosed in Japanese Patent Application Laid-Open No. 2012-130231, the following problem arises.

Figure 14:
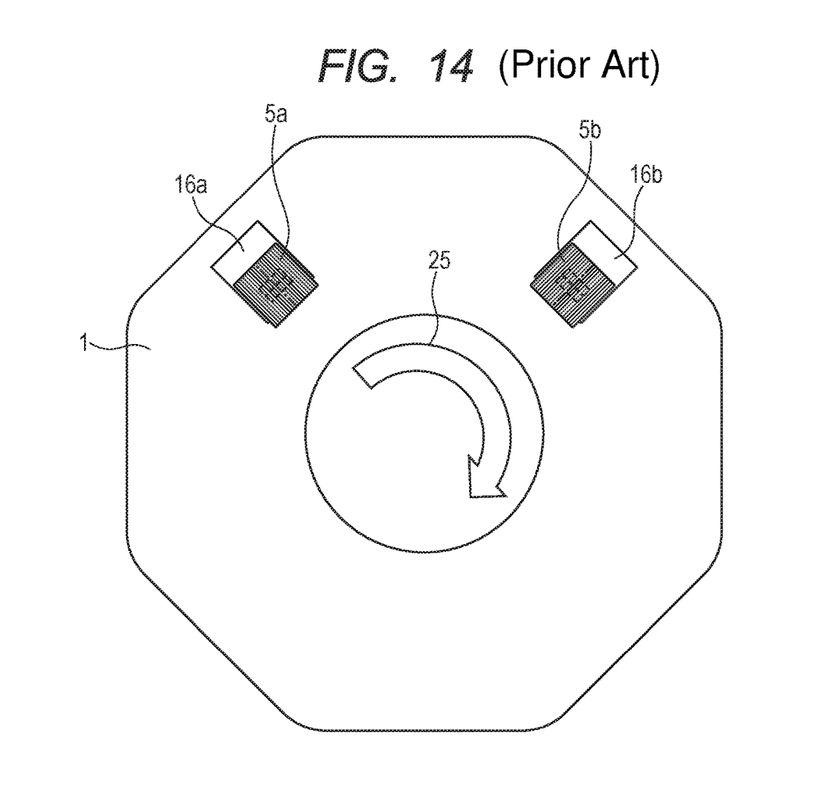
FIG. 14 is a diagram showing an image stabilization apparatus having a prior art arrangement.
Figure 15A:
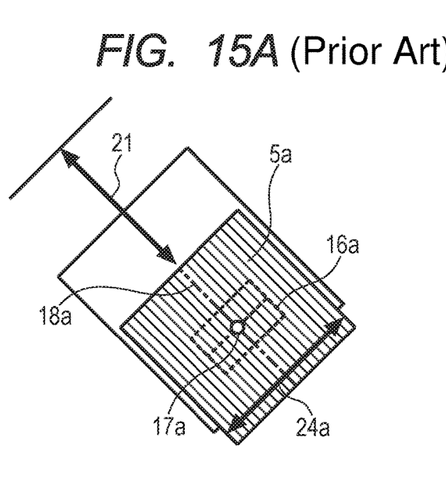
FIGS. 15A and 15B are enlarged views showing the arrangement of scales of the image stabilization apparatus shown in FIG. 14
Figure 15B:
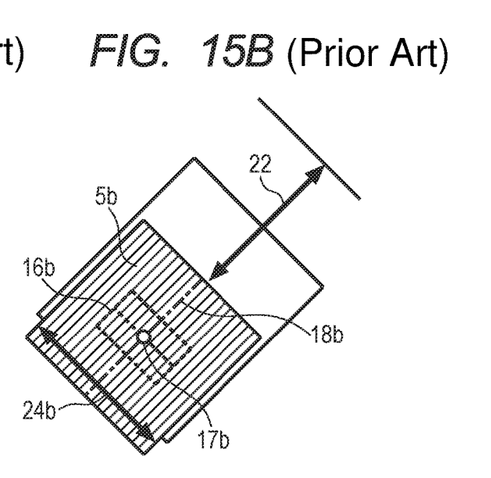
Figure 16A:
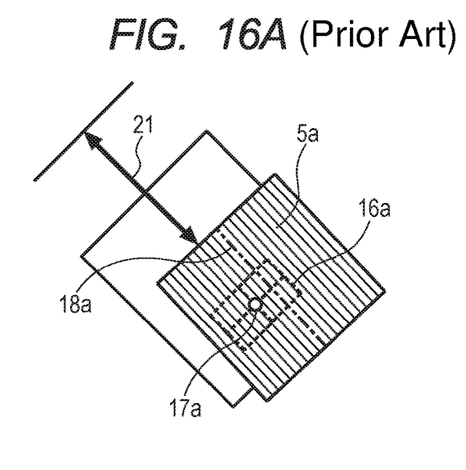
FIGS. 16A and 16B are enlarged views of the scales and detectors of encoders in a case where the lens moving frame shown in FIG. 14 is rotated in the direction indicated by arrow 25.
Figure 16B:
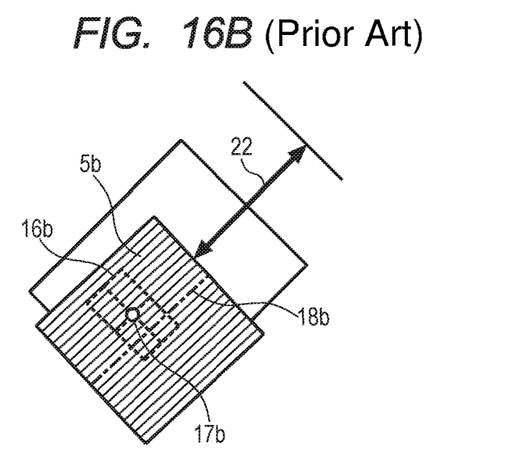
Figure 17:
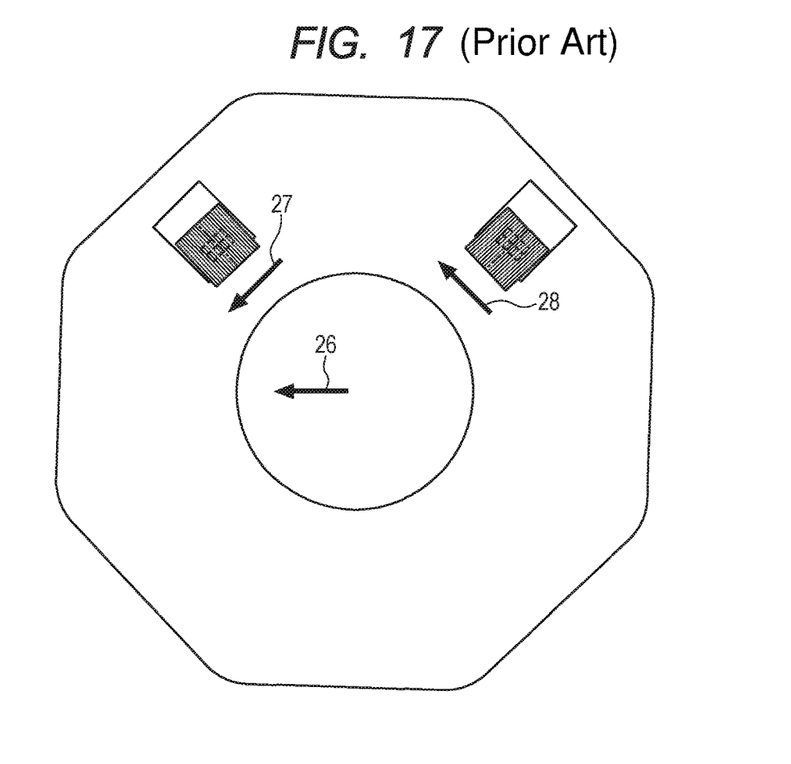
FIG. 17 is a front view of the image stabilization apparatus in a state after position control works after the rotation of the lens moving frame.
Figure 18A:
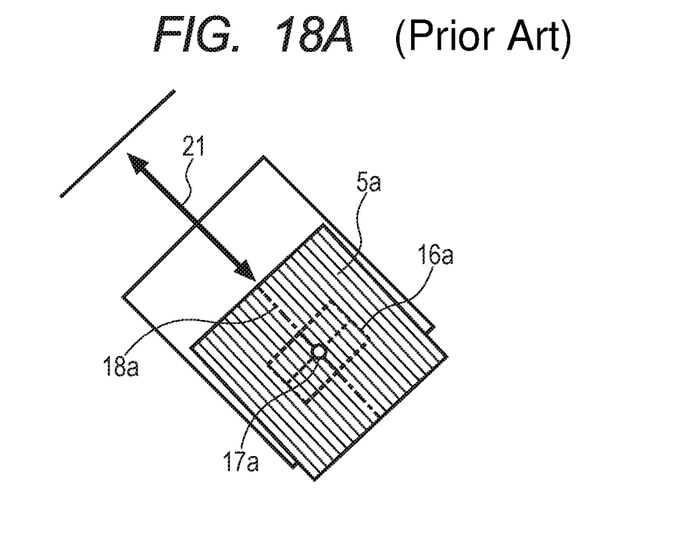
FIGS. 18A and 18B are enlarged views of the scales and the detectors of the encoders in FIG. 17.
Figure 18B:
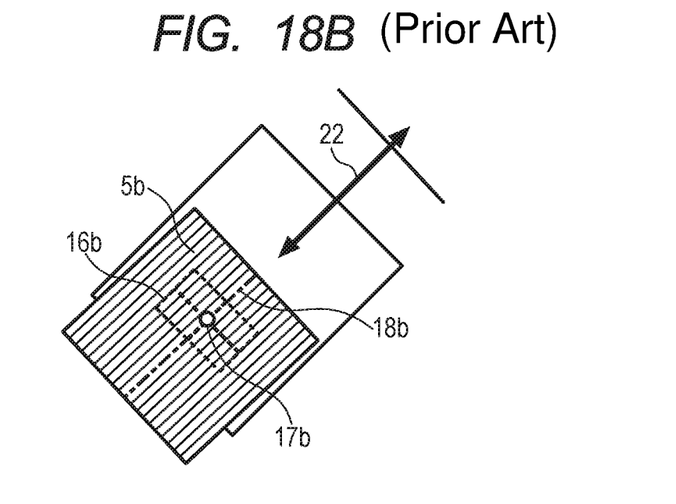

The problem encountered with the apparatus disclosed in Japanese Patent Application Laid-Open No. 2012-130231 will be described with reference to FIGS. 14, 15A, 15B, 16A, 16B, 17, 18A, and 18B. As shown in FIGS. 14, 15A, and 15B, in the apparatus disclosed in Japanese Patent Application Laid-Open No. 2012-130231, scales 5a, 5b arranged in such a way that their scale pitch directions 24a, 24b are oriented perpendicular to radial directions 21, 22 from the optical axis. The thin linear lines on the scales 5a, 5b represent the scale pitches. The lens moving frame 1 is mechanically supported and has play. FIGS. 16A and 16B show the positional relationship between the scales 5a, 5b and detectors 16a, 16b that constitute encoders in a case where the lens moving frame 1 rotates about the optical axis within the range of the play. As the lens moving frame 1 rotates, the detection elements 17a, 17b of the detectors and the centers of the scales 18a, 18h displace from each other. Then, a position controller (not shown) controls the driving of an ultrasonic motor (not shown) so as to align the centers 18a, 18b of the scales 5a, 5b provided on the lens moving frame 1 with the detection elements 11a, 17b. This control drives the lens moving frame 1 in the directions indicated by arrows 27 and 28 in FIG. 17. Consequently, as shown in FIGS. 18A and 18B, the scale centers 18a, 18b and the detection elements 17a, 17b are aligned with each other, and it is determined in the control process that the lens moving frame 1 has been returned back to the optical axis. However, as shown in FIG. 17, as the lens moving frame 1 is driven in the directions indicated by arrows 27 and 28, the actual optical axis is shifted in the direction indicated by arrow 26. Then, while it is determined by the detectors 16a, 16b that the lens moving frame 1 has been returned back to the optical axis, the actual optical axis is displaced from the initial position. In consequence, when the position control works in response to rotation of the lens moving frame due to play, a displacement of the optical axis may result. This leads to a deterioration in the image stabilization performance.

SUMMARY OF THE INVENTION

An object of the present invention is to provide an image stabilization apparatus with improved image stabilization performance by decreasing the sensitivity in the rotational direction of the lens moving frame to reduce the displacement of the optical axis due to play without using additional components.

To achieve the above object, according to the present invention, there is provided an image stabilization apparatus for a lens apparatus that moves an image stabilization lens in a plane perpendicular to an optical axis, comprising a fixed lens barrel, a lens moving frame holding the image stabilization lens and movable relative to the fixed lens barrel in a plane perpendicular to the optical axis of the image stabilization lens, an actuator that drives the lens moving frame relative to the fixed lens barrel in said plane, and two or more encoders used to determine the position of the lens moving frame relative to the fixed lens barrel in said plane, wherein each of the encoders includes a scale fixed to either the lens moving frame or the fixed lens barrel and a detector fixed to the other, the scale is arranged such a way that the direction of arrangement of its grating is oriented in a radial direction about the optical axis so that the encoder has a sensitivity to a displacement of the lens moving frame in the radial direction about the optical axis which is higher than a sensitivity to a displacement of the lens moving frame in a rotation direction about the optical axis.

The present invention provides an image stabilization apparatus with improved image stabilization performance by decreasing the sensitivity in the rotational direction of the lens barrel in its rotational direction to reduce the displacement of the optical axis due to play without using additional components.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
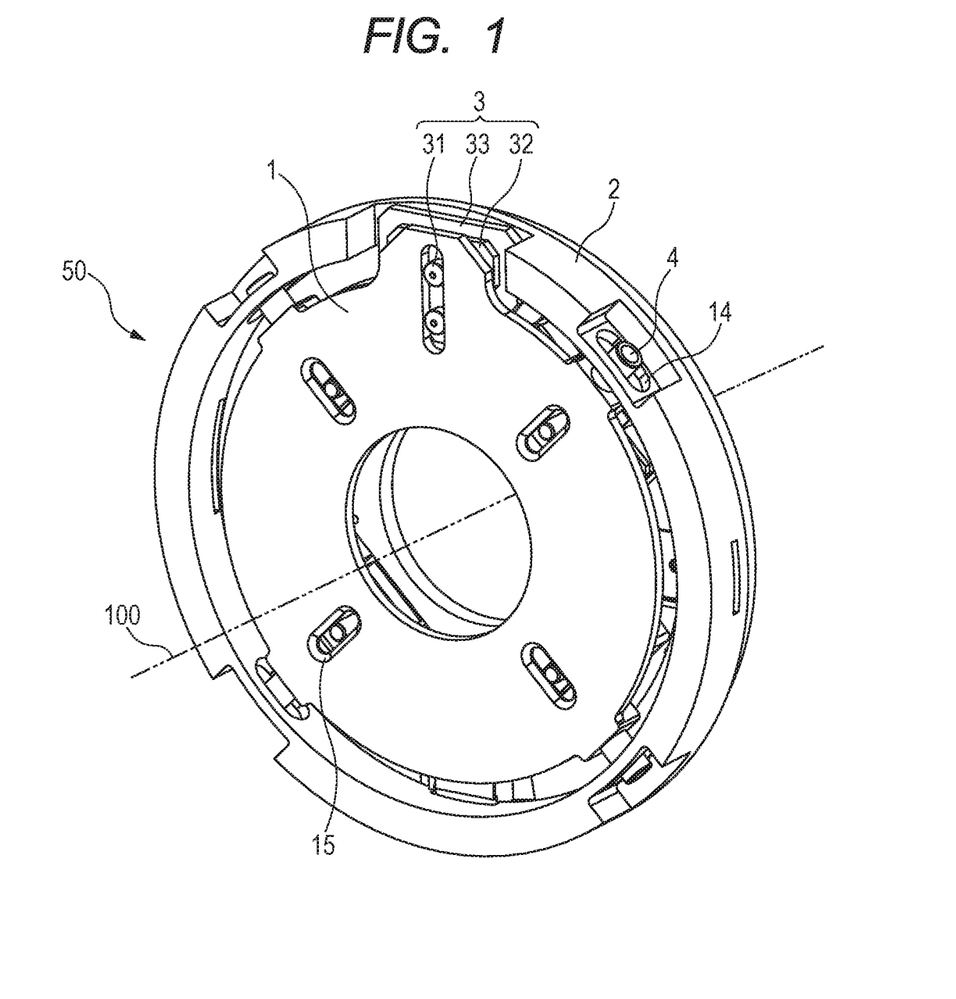
FIG. 1 is a perspective view of an image stabilization apparatus seen from the object side.
Figure 2:
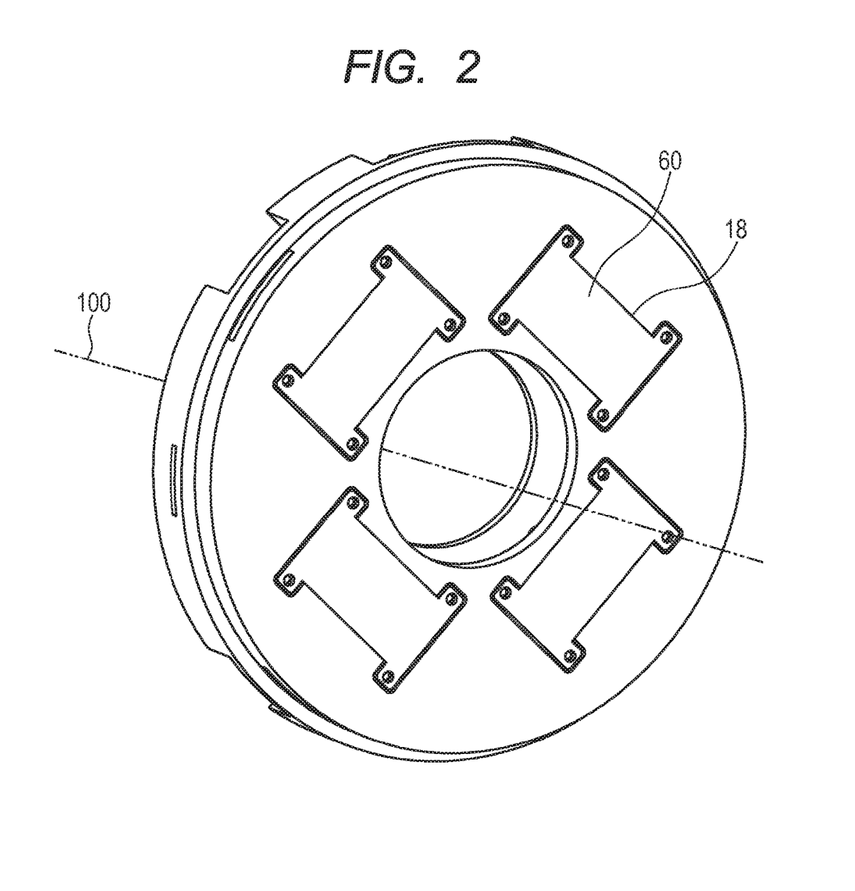
FIG. 2 is a perspective view of the image stabilization apparatus seen from the image pickup element side.
Figure 3:
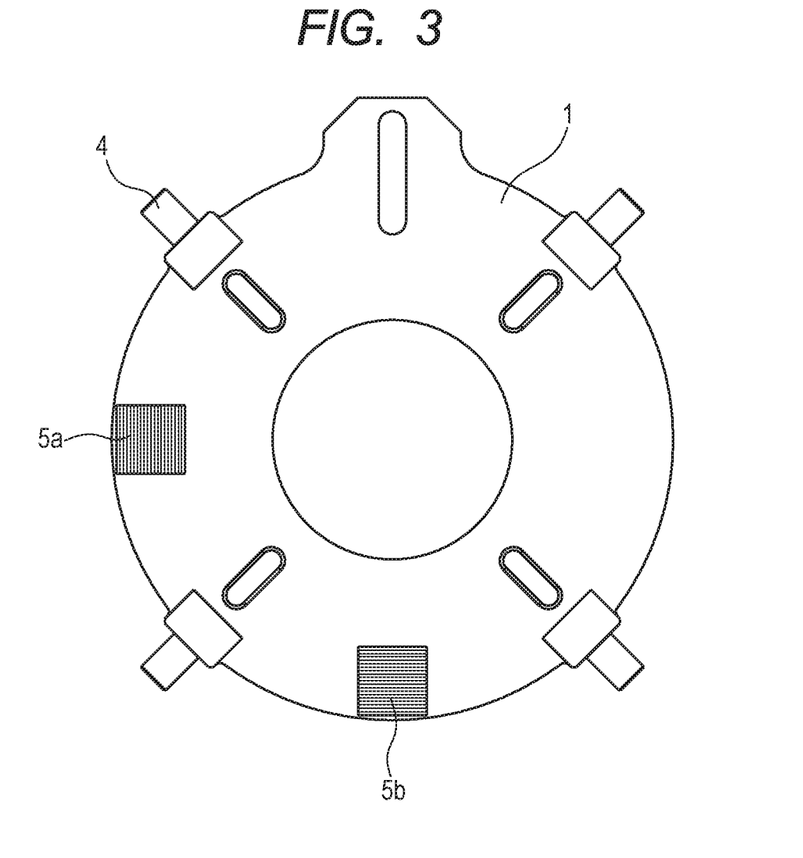
FIG. 3 is a front view of a lens moving frame seen from the image pickup element side.
Figure 4:
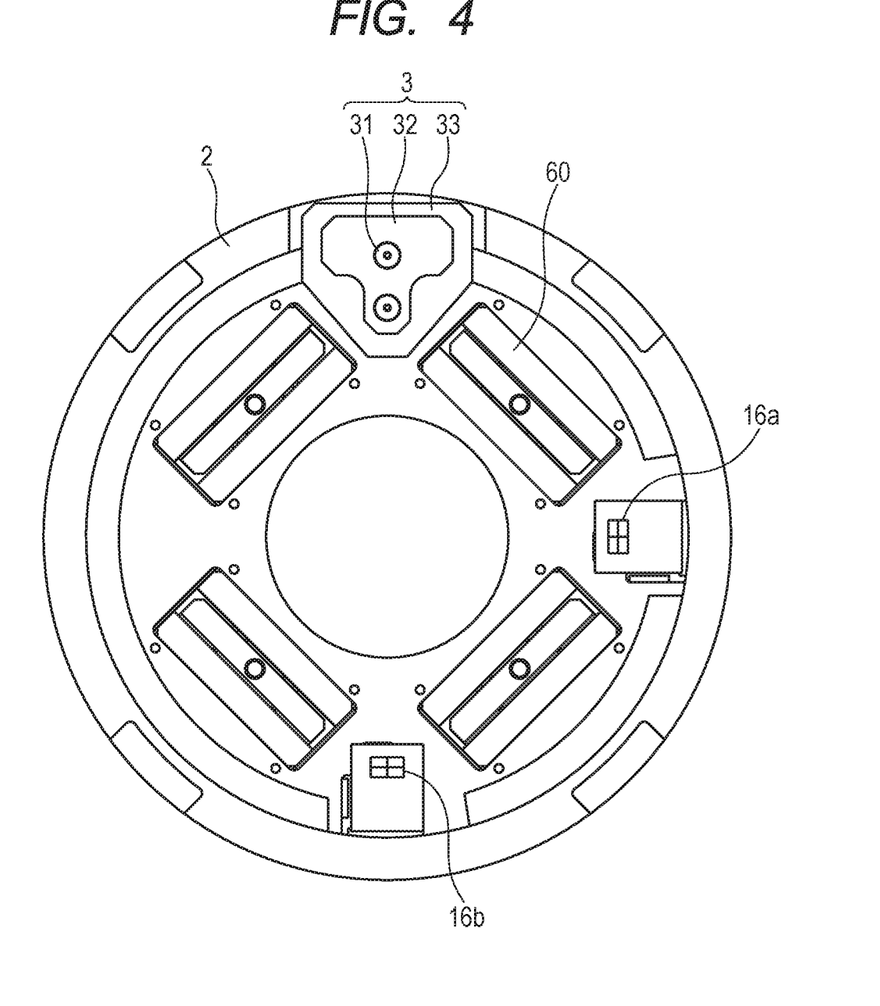
FIG. 4 is a front view of the image stabilization apparatus shown in FIG. 1 with the lens moving frame removed.
Figure 5:
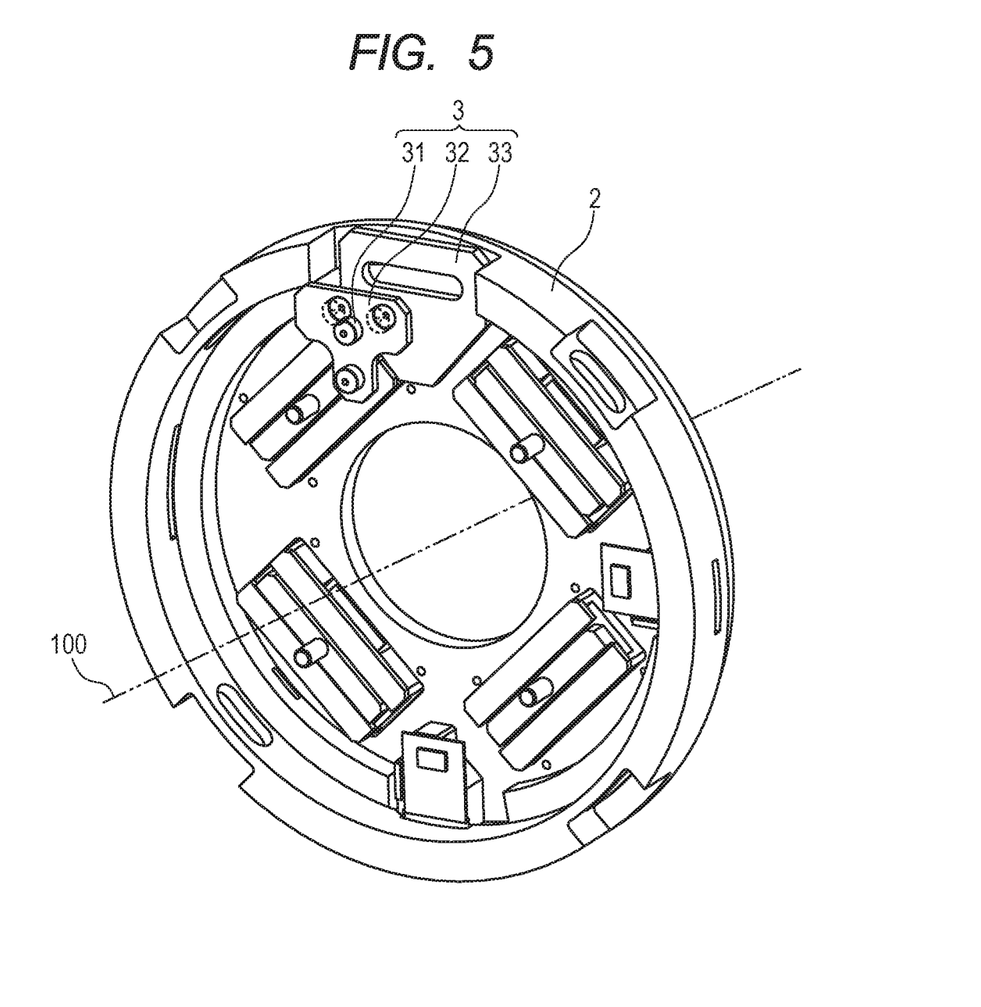
FIG. 5 is a perspective view of the image stabilization apparatus 50, where an intermediate plate 32 is displaced from its position shown in FIG. 4 in the direction of the optical axis 100.
Figure 6:
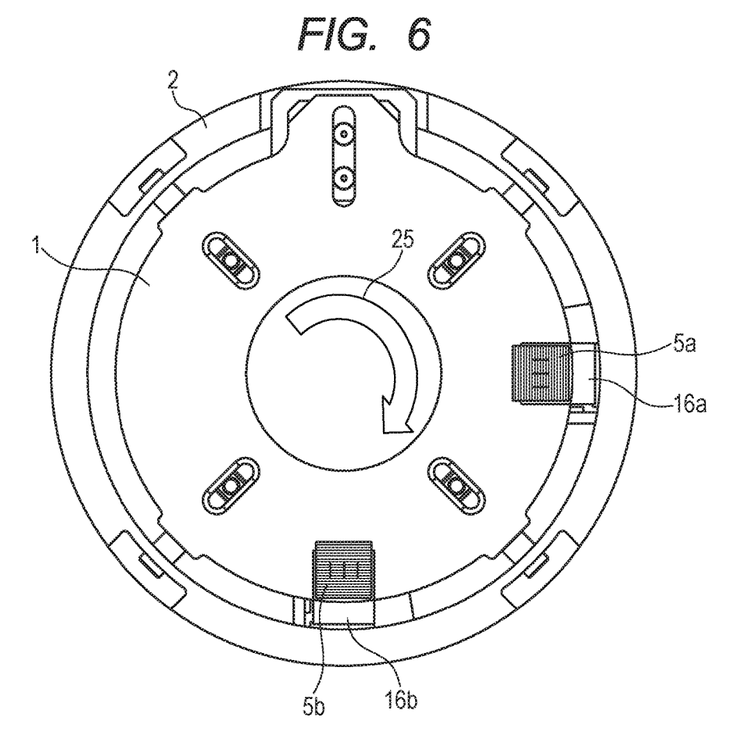
FIG. 6 is a front view of the image stabilization apparatus according to a first embodiment seen from the object side.
Figure 7A:
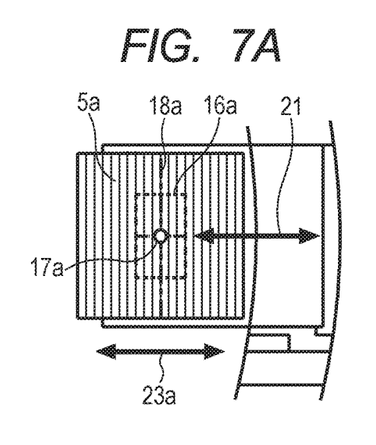
FIGS. 7A and 7B are enlarged views showing the arrangement of scales in the first embodiment.
Figure 7B:
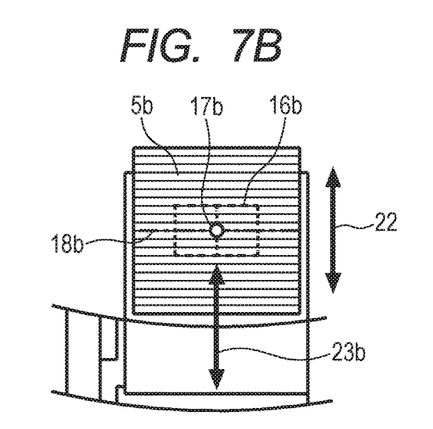
Figure 9:
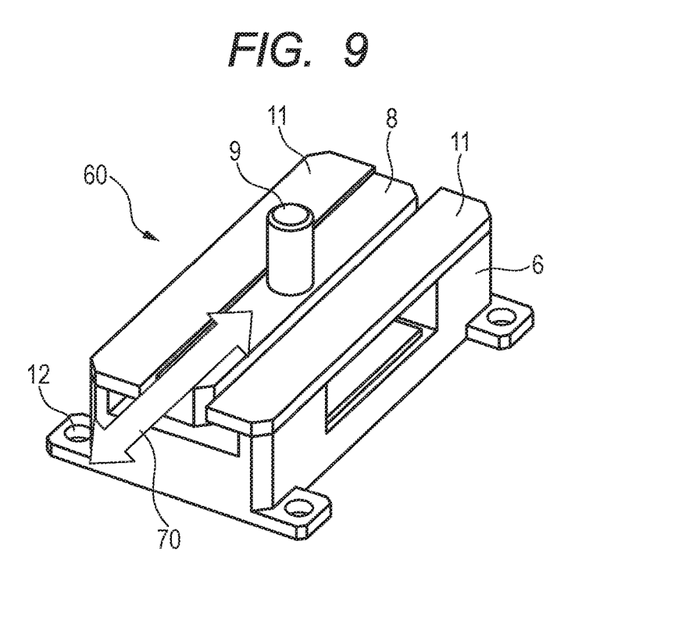
FIG. 9 is a perspective view of an ultrasonic motor.
Figure 10:
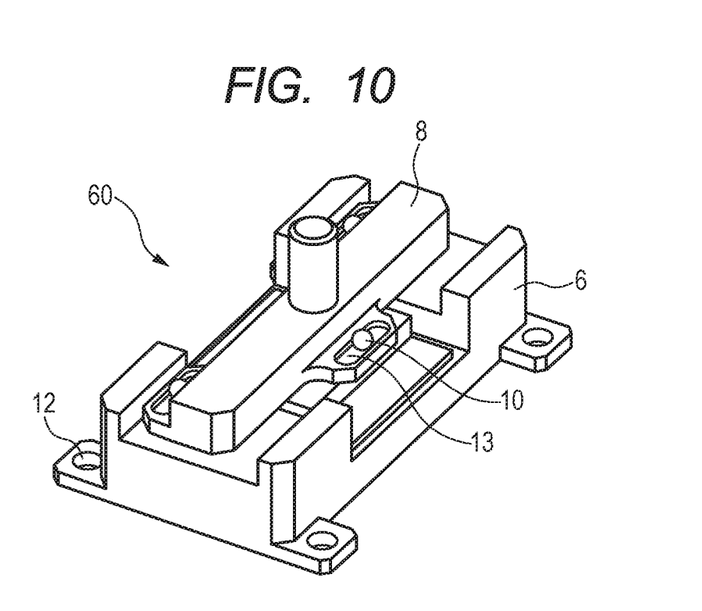
FIG. 10 is a perspective view of the ultrasonic motor shown in FIG. 7 with a fixed plate removed.
Figure 11:
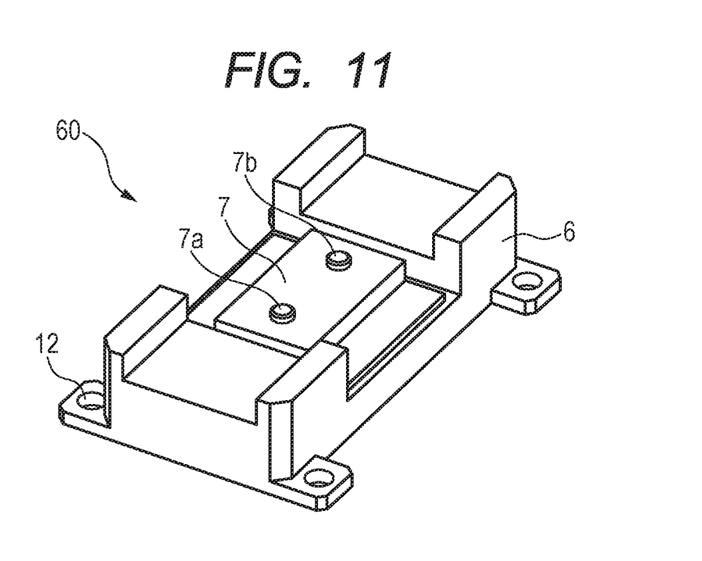
FIG. 11 is a perspective view of the ultrasonic motor shown in FIG. 8 with a drive slider and balls removed.

FIG. 1 is a perspective view of an image stabilization apparatus 50 according to an embodiment seen from the object side. The two-dot chain line in FIG. 1 indicates the direction of the optical axis 100 of an image stabilization lens provided in the image stabilization apparatus of this embodiment. This direction is parallel with the direction of the optical axis of a lens apparatus equipped with the image stabilization apparatus. FIG. 2 is a perspective view of the image stabilization apparatus 50 of this embodiment seen from the image pickup element side. In the following description, the terms "object side" and "image pickup element side" will be used as in the description with FIGS. 1 and 2. It should be understood, however, that these terms are used for the sake of convenience, and the image stabilization apparatus according to the present invention is not necessarily be arranged in the lens apparatus in the orientation specified by these terms. The image stabilization apparatus may be arranged in the lens apparatus with the sides referred to as the object side and the image pickup element reversed. FIG. 3 is a front view of a lens moving frame 1 seen from the image pickup element side. FIG. 4 is a front view of the image stabilization apparatus 50 with the lens moving frame 1 removed, seen from the object side. FIG. 5 is a perspective view of the image stabilization apparatus 50, where an intermediate plate 32 is displaced from its position shown in FIG. 4 in the direction of the optical axis 100. FIG. 6 is a front view of the image stabilization apparatus 50 seen from the object side. FIG. 6 shows scales 5a, 5b provided on the lens moving frame 1 on its side facing detectors 16a, 16b of encoders. FIGS. 7A and 7B are enlarged views showing the arrangement of the scales 5a, 5b in the first embodiment. FIG. 9 is a perspective view of an ultrasonic motor 60 provided in the image stabilization apparatus 50. FIG. 10 is a perspective view of the ultrasonic motor 60 shown in FIG. 9 with a fixed plate 11 removed. FIG. 11 is a perspective view of the ultrasonic motor 60 shown in FIG. 10 with a drive slider 8 and balls 10 removed.

The ultrasonic motor 60 used in the image stabilization apparatus 50 will be described with reference to FIGS. 9, 10, and 11. The ultrasonic motor 60 has a motor base 6 serving as a base and a vibrator 7 fixed to the motor base 6. A drive slider 8 is provided on the vibrator 7. The drive slider 8 is in contact with projections 7a, 7b of the vibrator 7. The drive slider 8 is provided with an output shaft 9 that extends in the direction perpendicular to the driving direction indicated by an arrow 70 to transmit driving force to the lens moving frame 1. The drive slider 8 has a plurality of roll grooves 13 in which balls 10 rolls. The balls 10 are set in the roll grooves 13, and a fixing plate 11 is put on the balls 10 and fixed to the motor base 6 by screws (not shown) to bring the drive slider 8 in pressure contact with the projections 7a, 7b of the vibrator 7 via the balls 10. The fixing plate 11 is also provided, on its back side, with roll grooves (not shown), which are opposed to the roll grooves 13 of the drive slider 8 to allow balls to roll therein. The guidance by the roll grooves 13 and the balls 10 restricts the drive direction of the drive slider 8 to the direction indicated by the arrow 10. As voltage is applied to the vibrator 1 by voltage supply means (not shown) to generate driving force, the drive slider 8 moves in the direction indicated by the arrow 70 with the aforementioned guidance.

Next, an image stabilization mechanism will be described with reference to FIGS. 1 to 5. An image stabilization lens unit (not shown) is held by the lens moving frame 1. The lens moving frame 1 has a plurality of engagement grooves 15 with each of which the output shaft engages to transmit driving force generated by the ultrasonic motor 60. While the engagement grooves 15 in this embodiment are through-grooves, the engagement grooves 15 provided in this embodiment are not limited to through-grooves, but they may be stopped grooves that do not pass through the lens moving frame 1. The image stabilization mechanism includes a fixed lens barrel 2 to which the detectors 16a, 16b of the encoders used to determine the position of the lens moving frame 1 are fixed. The detectors 16a, 16b are disposed in such a way that the detection elements 17a, 17b are located at positions equidistant from the optical axis 100 and forming an angle of 90 degrees with the optical axis. The lens moving frame 1 is provided with scales 5a, 5b on its surface opposed to the detectors 16a, 16b. Thin linear lines drawn in the scales 5a, 5b represent scale pitches (or grating).

In the illustrative case described here, the scales 5a, 5b are fixed on the lens moving frame 1, and the detectors 16a, 16b are fixed on the fixed lens barrel 2. However, the advantageous effects of the present invention can also be enjoyed so long as the scales are fixed on either the lens moving frame or the fixed lens barrel and the detectors are fixed on the other.

The fixed lens barrel 2 has a plurality of circumferential grooves 14 that are arranged circumferentially about the optical axis 100. The circumferential grooves 14 restrict the movement of the lens moving frame 1 with respect to the direction of the optical axis 100 and allow the lens moving frame 1 to move freely in a plane perpendicular to the optical axis 100. The lens moving frame 1 is provided with a plurality of cam followers 4 arranged circumferentially about the optical axis 100. The cam followers 4 engage with the circumferential grooves 14 of the fixed lens barrel 2. The fixed lens barrel 2 is provided with a rotation restriction mechanism 3 that restricts the rotation of the lens moving frame 1 about the optical axis. The rotation restriction mechanism 3 includes a support plate 33, an intermediate plate 32, and bearings 31. The support plate 33 is provided with a liner slot and fixed to the fixed lens barrel 2. The bearings 31 are attached on the intermediate plate 32. Specifically, as shown in FIG. 5, two bearings 31 are arranged along the vertical direction (i.e. radial direction) on the front side of the intermediate plate (as shown by solid lines) and other two bearings 31 are arranged along the horizontal direction on the rear side of the intermediate plate 32 (as shown by broken lines). The hearings 31 on the front side are slidably inserted in a linear slot provided in the lens moving frame 1, and the bearings 31 on the rear side are slidably inserted in the linear slot provided in the support plate 33. This rotation restriction mechanism 3 allows the lens moving frame 1 to translate freely in a plane perpendicular to the optical axis 100 and restricts rotation of the lens moving frame 1 about the optical axis 100. The ultrasonic motors 60 are received in openings 18 provided in the fixed lens barrel 2 and fixed to the fixed lens barrel 2 by screws (not shown). With the ultrasonic motors 60 arranged in the manner shown in FIG. 4, the lens moving frame 1 can be moved two-dimensionally by driving the four ultrasonic motor 60 in combined manner. The image stabilization apparatus is constituted by the above-described components and an acceleration sensor and a control unit.

Figure 8A:
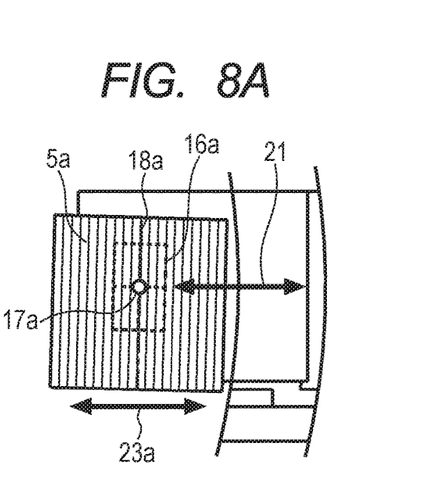
FIGS. 8A and 8B are enlarged views of the scales and detectors of encoders in a case where the lens moving frame is rotated by 2 degrees in the direction indicated by arrow 25 in FIG. 5.
Figure 8B:
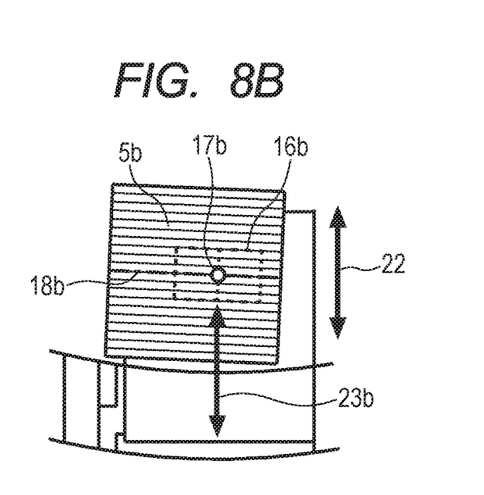

The apparatus according to the first embodiment will be described with reference to FIGS. 6, 7A, 7B, 8A, and 8B. FIG. 7 shows the arrangement of the scales 5a, 5b in the first embodiment. In the first embodiment, the pitch direction 23a, 23b of each scale 5a, 5b is oriented parallel to the radial direction 21, 22 from the optical axis. Thus, the scales are arranged in such a way that the encoders are sensitive to movements in radial directions and the sensitivity of the encoder to movements in the circumferential direction about the optical axis is low. That is, the scale is configured so that the encoder has a sensitivity to the displacement (movement) in the radial direction about the optical axis higher than a sensitivity to the displacement (movement) in the rotational direction about the optical axis. In other words, the scales are arranged in such a way that the sensitivity of the encoders to movements in radial directions is maximized and the sensitivity of the encoders to movements in the circumferential direction about the optical axis is minimized. Since the lens moving frame 1 is attached to the fixed lens barrel 2 via the rotation restriction mechanism, the lens moving frame 1 has play. Here, we will discuss a case in which the lens moving frame 1 rotates about the optical axis in the direction indicated by the arrow 25 in FIG. 6 within the range of the play, as has been described in the description of the related art. FIGS. 8A and 8B illustrate the positional relationship between the scales 5a, 5b and the detectors 16a, 16b (with the detection elements 17a, 17b) in this state. In the case of the scale arrangement disclosed in Japanese Patent Application Laid-Open No. 2012-130231, rotation of the lens moving frame 1 causes the scale center 18a, 18b and the detection element 17a, 17b to displace from each other largely (which means high sensitivity in the rotational direction). Correction of this displacement by position control leads to a displacement of the optical axis. In the case of this embodiment, even if the lens moving frame 1 rotates, the displacement between the scale center 18a, 18b and the detection element 17a, 17b along the direction of detection is very low (which means low sensitivity in the rotational direction). Therefore, even if position control works in this case, the displacement of the optical axis will be small. The displacement $\Delta S_1$ of the optical axis is expressed by the angle of rotation $\theta$ of the lens moving frame 1 and the distance R between the optical axis and the detection element as follows.

$$\Delta S_1 = \sqrt{2} R \left(1 - \frac{1}{\cos\theta}\right) \quad (1)$$

In the case of the arrangement disclosed in Japanese Patent Application Laid-Open No. 2012-130231, the displacement $\Delta S_2$ of the optical axis is expressed as follows.

$$\Delta S_2 = \sqrt{2} R \sin\theta \quad (2)$$

With the above equations (1) and (2), if, for example, $\theta=1°$ and R=30, then $\Delta S_1=0.0065$ and $\Delta S_2=0.74$. Thus, the arrangement of this embodiment enables a large reduction in the displacement of the optical axis. Moreover, as the detectors (or the detection elements) of the encoders that measure the displacements in two directions are arranged equidistantly from the optical axis, the sensitivities in the circumferential direction about the optical system in measurement in two perpendicular directions are equally low, so that the displacement of the optical axis due to play of the lens moving frame can be reduced, and the image stabilization performance can be improved.

Figure 12:
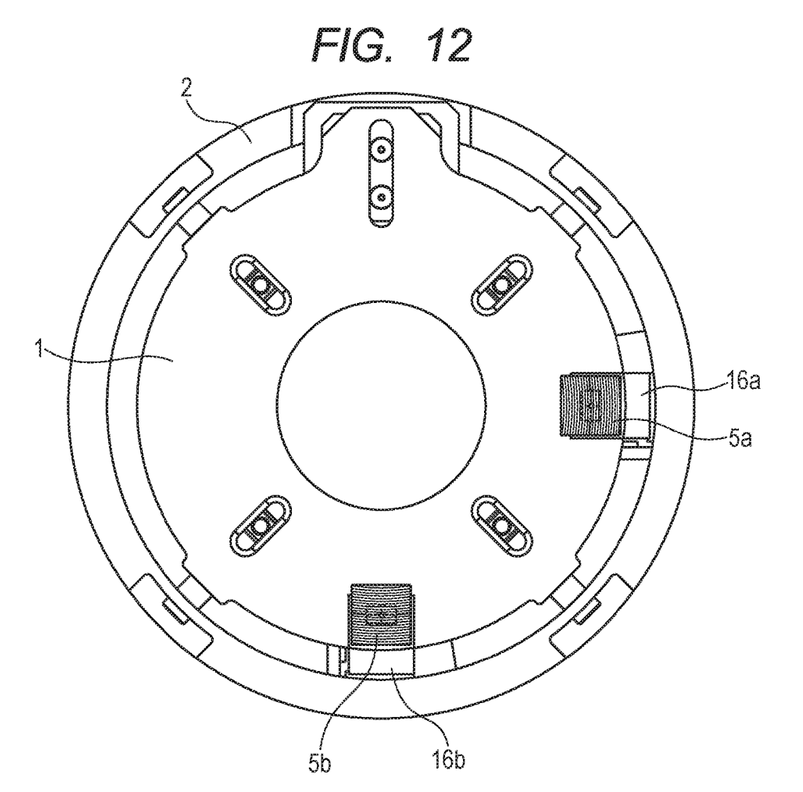
FIG. 12 is a front view of an image stabilization apparatus according to a second embodiment seen from the object side.
Figure 13A:
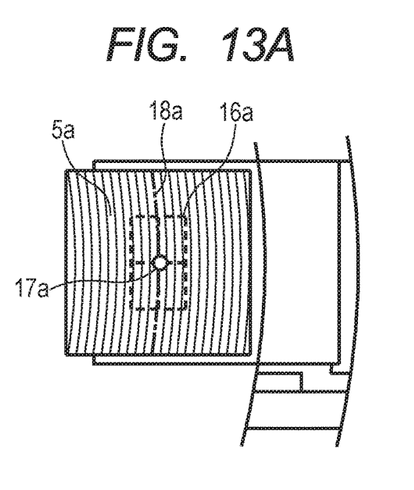
FIGS. 13A and 13B are enlarged views showing the arrangement of scales in the second embodiment.
Figure 13B:
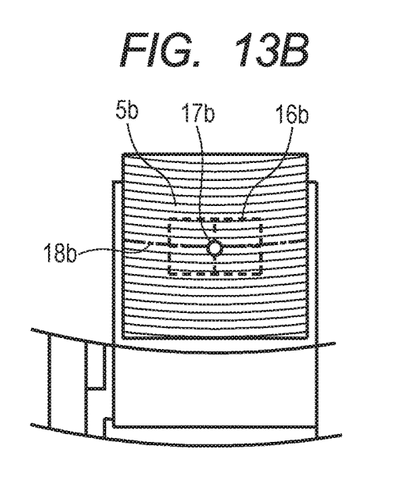

Next, a second embodiment will be described with reference to FIGS. 12, 13A and 13B. FIG. 12 is a front view of an image stabilization apparatus of the second embodiment. In FIG. 12, a part of the lens moving frame 1 is shown as a perspective view to show the scales 5a and 5b. FIGS. 13A and 13B are enlarged views showing the arrangement of the scales 5a, 5b in the second embodiment. In the second embodiment, the scale pitches of the scales 5a, 5b have circular arc shape about the optical axis. This makes the displacement between the scale center 18a, 18b and the detection element 17a, 17b in the measurement direction small when the lens moving frame 1 rotates, and the displacement of the optical axis will be small accordingly.

With the above-described arrangement, the displacement of the optical axis due to play can be reduced by reduction of sensitivity in the rotational direction of the lens barrel without need for additional components, and the image stabilization performance can be improved.

In the above-described illustrative embodiments, the encoder is composed of a scale provided on the lens moving frame and a detector provided on the fixed lens barrel. However, the present invention is not limited to this arrangement. The advantageous effects of the present invention can be enjoyed so long as a scale is fixed on either the lens moving frame or the fixed lens barrel and a detector is fixed on the other. Therefore, the advantageous effects of the present invention can be enjoyed also in the case where the encoder is composed of a detector provided on the lens moving frame and a scale provided on the fixed lens barrel. The essential advantageous effect can be enjoyed irrespective of whether the scale and the detector are arranged on the lens moving frame or the fixed lens barrel. The radial orientation of the arrangement of scale grating (or pitch direction) about the optical axis, the arrangement of the detectors (or detection elements) equidistant from the optical axis, and the arrangement of the detectors (or detection element) that form an angle of 90 degrees may be set in a reference state in which the lens moving frame is at a position when no image stabilization operation is carried out.

A lens apparatus equipped with the image stabilization apparatus according to the above-described embodiment and an image pickup apparatus including such a lens apparatus and an image pickup element that receives an optical image formed by the lens apparatus can also enjoy the advantageous effects of the present invention. The present invention provides such a lens apparatus and image pickup apparatus also.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-070760, filed Mar. 31, 2016, which is hereby incorporated by reference herein in its entirety.

What is claimed is:

1. An image stabilization apparatus, for a lens apparatus, that moves an image stabilizing lens in a moving direction having, as a component thereof, a direction perpendicular to an optical axis of the image stabilizing lens, the image stabilization apparatus comprising:
   a fixed lens barrel;
   a lens moving frame holding the image stabilizing lens and movable relative to the fixed lens barrel in the moving direction;
   an actuator configured to move the lens moving frame in the moving direction; and
   an encoder for detecting a position of the lens moving frame in the moving direction,
   wherein the encoder includes a scale fixed to one of the lens moving frame and the fixed lens barrel and a detector fixed to the other of the lens moving frame and the fixed lens barrel, and the scale is arranged on the one of the lens moving frame and the fixed lens barrel and on a radial ray with respect to the optical axis such that grating elements of the scale are arranged along the radial ray.

2. The image stabilization apparatus according to claim 1, wherein the scale is fixed to the lens moving frame and the detector is fixed to the fixed lens barrel.

3. The image stabilization apparatus according to claim 1, wherein two of the detectors are respectively arranged along two of the radial rays.

4. The image stabilization apparatus according to claim 1, wherein one of the grating elements has a shape of a circular arc with respect to the optical axis.

5. The image stabilization apparatus according to claim 1, wherein two of the detectors are respectively arranged at two of the radial rays.

6. A lens apparatus comprising:
   an image stabilizing lens; and
   an image stabilization apparatus that moves the image stabilizing lens in a moving direction having, as a component thereof, a direction perpendicular to an optical axis of the image stabilizing lens, the image stabilization apparatus comprising:
   a fixed lens barrel;
   a lens moving frame holding the image stabilizing lens and movable relative to the fixed lens barrel in the moving direction;
   an actuator configured to move the lens moving frame in the moving direction; and
   an encoder for detecting a position of the lens moving frame in the moving direction,
   wherein the encoder includes a scale fixed to one of the lens moving frame and the fixed lens barrel and a detector fixed to the other of the lens moving frame and the fixed lens barrel, and the scale is arranged on the one of the lens moving frame and the fixed lens barrel and on a radial ray with respect to the optical axis such that grating elements of the scale are arranged along the radial ray.

7. An image pickup apparatus comprising:
   a lens apparatus; and
   an image pickup element configured to receive an image formed by the lens apparatus,
   wherein the lens apparatus comprises:
   an image stabilizing lens; and
   an image stabilization apparatus that moves the image stabilizing lens in a moving direction having, as a component thereof, a direction perpendicular to an optical axis of the image stabilizing lens, the image stabilization apparatus comprising:
   a fixed lens barrel;
   a lens moving frame holding the image stabilizing lens and movable relative to the fixed lens barrel in the moving direction;
   an actuator configured to move the lens moving frame in the moving direction; and
   an encoder for detecting a position of the lens moving frame in the moving direction,
   wherein the encoder includes a scale fixed to one of the lens moving frame and the fixed lens barrel and a detector fixed to the other of the lens moving frame and the fixed lens barrel, and the scale is arranged on the one of the lens moving frame and the fixed lens barrel and on a radial ray with respect to the optical axis such that grating elements of the scale are arranged along the radial ray.

* * * * *